United States Patent Office 2,978,475
Patented Apr. 4, 1961

2,978,475

NITRO-SUBSTITUTED DIISOCYANATE COMPOUNDS

Karl Klager, Monrovia, Calif., assignor to Aerojet-General Corporation, Azusa, Calif., a corporation of Ohio No Drawing. Filed Mar. 26, 1956, Ser. No. 574,035

8 Claims. (Cl. 260—453)

This invention relates to new compositions of matter and in particular to a new class of nitro-substituted diisocyanate compounds having the general formula:

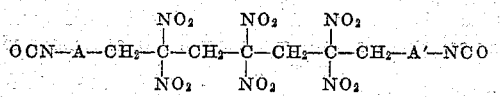

wherein A and A' are lower alkylene radicals.

This application is a continuation-in-part of my copending U.S. patent application Ser. No. 397,017, filed December 8, 1953, now abandoned.

The new compositions of my invention are prepared by reacting a dibasic acid halide with an alkali metal or alkaline earth metal azide to form the corresponding diazide compound and subsequently heating the diazide compound to effect rearrangement to the desired diisocyanate. The reaction proceeds according to the general reaction scheme set forth below.

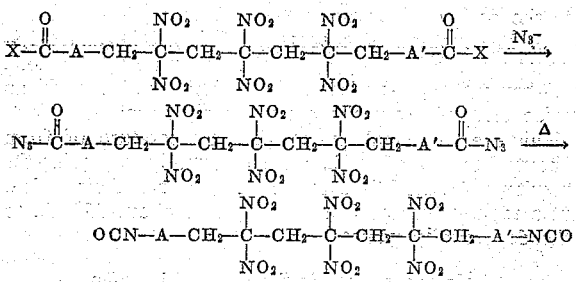

wherein X is a halogen radical and A and A' are lower alkylene radicals. The azide salt employed in this procedure can be any of the alkali or alkaline earth metal azides, such as potassium azide, magnesium azide or the like, however sodium azide is the preferred reactant in the practice of this invention for reasons of cost and convenience. The diacid halide compounds used as starting materials in the practice of this invention are prepared from the corresponding diacid compounds in the conventional manner, for example by reaction with $PCl_3$ or $PBr_5$. The diacids are obtained by the procedure disclosed in my copending U.S. patent application Ser. No. 392,479, filed November 16, 1953, now abandoned.

The following examples are presented to more clearly illustrate my invention, it should be understood however that these examples are provided solely for the purpose of illustration and should not be considered to limit the scope of the invention in any way.

EXAMPLE I

*Preparation of 4,4,6,6,8,8-hexanitro-1,11-undecanedioyl chloride*

A mixture of 14 gm. 4,4,6,6,8,8-hexanitro-1,11-undecanedioic acid and 40 ml. phosphorus oxychloride was allowed to react gradually with 19 gm. phosphorus pentachloride. The temperature rose to 55° C; the mixture was then heated to 80° C for 15 minutes. The phosphorus oxychloride was removed from the solution under vacuum until crystals appeared, and 30 ml. benzene was added to complete crystallization. The crystals were collected and washed with hexane and absolute ether. The yield was 8.4 gm. Hexane caused precipitation of a second fraction, which was filtered off and washed with 4.6 gm. of absolute ether. The total yield was 13.0 gm. A sample recrystallized from phosphorus oxychloride and monochlorobenzene melted at 120–121° C; this sample was used for analysis. The mixed melting-point with 4,4,6,8,8-pentanitro-1,11-undecanedioyl chloride (M.P. 141° C) was depressed to 110–112° C.

*Analysis.*—Calc'd. for $C_{11}H_{12}N_6O_{14}Cl_2$: Percent C, 25.25; percent H, 2.31; percent N, 16.07; percent Cl, 13.55. Found: Percent C, 25.85; percent H, 2.49; percent N, 15.96; percent Cl, 13.25.

EXAMPLE II

*Preparation of 4,4,6,6,8,8-hexanitro-1,11-undecanedioic azide*

A mixture of 4 gm. sodium azide in 30 ml. acetic acid was poured into a suspension of 5 gm. 4,4,6,6,8,8-hexanitro-1,11-undecanedioyl dichloride in 30 ml. acetic acid at 10–15° C. While the mixture was stirred vigorously the temperature tended to rise, but was kept at 15° C. by means of outside cooling with ice water. After 60 minutes' stirring, 100 ml. methylene chloride was added and the solution was washed twice with ice water, once with 1% sodium bicarbonate and once with water again. After drying over sodium sulfate, the solution was concentrated in vacuum at room temperature; the receiver was kept in Dry Ice. White crystals were obtained by adding ether to the concentrate. The yield was 2.2 gm., M.P. 83–85° C.

EXAMPLE III

*Preparation of 3,3,5,5,7,7-hexanitro-1,9-nonane diisocyanate*

A three-necked flask provided with a stirrer and thermometer was charged with 10 gm. of 4,4,6,6,8,8-hexanitro-1,11-undecanedioyl chloride and 80 ml. acetic acid and cooled with ice water to 10° C. Eight gm. sodium azide was added at once while the mixture was stirred rapidly. The temperature rose to 22° C. and a milky-white suspension was formed. Stirring at 15 to 20° C. was continued for 45 minutes and the mixture was then diluted with 150 ml. methylene chloride. The solution was then washed in a separatory funnel twice with two 100 ml. portions of water, once with aqueous 1% sodium bicarbonate, and once again with water. After drying over sodium sulfate the methylene chloride solution was concentrated in vacuo at room temperature; the receiver was cooled with Dry Ice and acetone. The crystals formed were precipitated with absolute ether collected on a filter, then washed with absolute ether and replaced in the flask. The crystals dissolved easily in 100 ml. dioxane and the solution obtained was heated slowly to 80–85° C., using a reflux condenser with Drierite tube. At 70° C. the nitrogen evolution started and was over within 15 minutes, at 80–85° C. Heating was continued for 1 hour and the solution was then concentrated in vacuo. The golden-yellow residue soon crystallized and was triturated with absolute ether. After filtration and washing with ether, the crystals were reprecipitated repeatedly from a concentrated solution in dioxane with carbon tetrachloride. The melting point was 126–128° C.

*Analysis.*—Calc'd. for $C_{11}H_{12}N_8O_{14}$: Percent C, 27.51; percent H, 2.52; percent N, 23.33. Found: Percent C, 27.78; percent H, 2.56; percent N, 23.70.

Other members in the homologous series of compounds of this invention can be prepared by reacting appropriate starting materials in accordance with the foregoing examples. For example, the diacid chloride of 6,6,8,8,10,10-hexanitro-1,15-pentadecanedioic acid readily reacts with sodium azide to yield its corresponding diazide, which in turn rearranges through the application of heat to form the desired diisocyanate compound, 5,5,7,7,9,9-hexanitro-1,13-tridecanediisocyanate. Other members of this series can be prepared by the same procedure, starting with appropriate diacid halides.

The new compositions of this invention are useful in the preparation of high energy polyurethane propellants. For example, 3,3,5,5,7,7-hexanitro-1,9-nonane diisocyanate reacts with glycols such as 2,2-dinitro-1,3-propanediol, 2,2,4,4-tetranitro-1,5-pentanediol and 2-nitro-2-methyl-1,3-propanediol to form high molecular weight polyurethane compounds. This reaction proceeds under the conditions and according to the method disclosed in assignee's copending U.S. patent application Ser. No. 422,649, filed April 12, 1954, now abandoned. The polyurethanes thus obtained can be molded, cast, or formed into tubular shape and enclosed in a rocket chamber in the conventional manner, for example as shown in assignee's copending U.S. patent application Ser. No. 516,352, filed June 20, 1955. They are ignited by suitable igniters, such as the igniter disclosed in assignee's copending U.S. patent application Ser. No. 306,030, filed August 23, 1952. Upon exhaustion through a nozzle, the gases produced by the resultant combustion can be used to propel any conventional rocket vehicle such as a guided missile, sounding rocket, smoke rocket, or the like.

In addition to use as a propellant per se, stoichiometric quantities of an inorganic oxidizing salt such as ammonium nitrate can be dispersed within the polyurethane resin to provide additional oxygen and higher energy for propellant use.

I claim:

1. As compositions of matter, the hexanitro diisocyanate compounds having the structural formula:

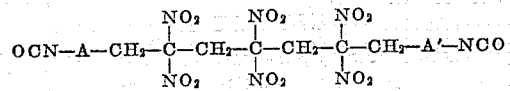

wherein A and A' are lower alkylene radicals.

2. As a composition of matter, 3,3,5,5,7,7-hexanitro-1,9-nonane diisocyanate having the structural formula:

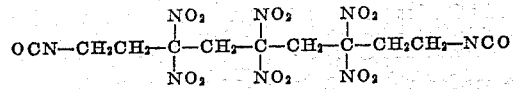

3. As a composition of matter, 5,5,7,7,9,9-hexanitro-1,13-tridecane diisocyanate having the structural formula:

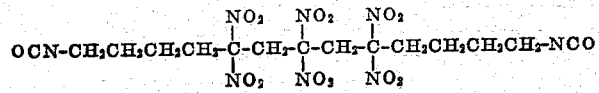

4. The method of preparing diisocyanate compounds having general formula:

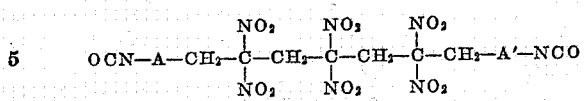

which comprises reacting the diacid halide composition having the structural formula:

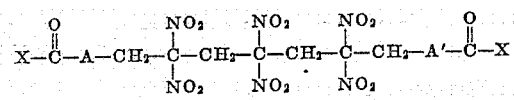

with an azide salt selected from the group consisting of alkali and alkaline earth metal azides and subsequently pyrolysing the resultant diacid azide to the desired diisocyanate, wherein A and A' are lower alkylene radicals and X is a halogen radical.

5. The method of preparing 3,3,5,5,7,7-hexanitro-1,9-nonane diisocyanate which comprises reacting a 4,4,6,6,8,8-hexanitro-1,11-undecanedioic diacid halide with an azide selected from the group consisting of alkali and alkaline earth metal azides and subsequently pyrolysing the resultant 4,4,6,6,8,8-hexanitro-1,11-undecanedioic azide to the desired diisocyanate.

6. The method of preparing 3,3,5,5,7,7-hexanitro-1,9-nonane diisocyanate which comprises reacting 4,4,6,6,8,8-hexanitro-1,11-undecanedioic diacid chloride with sodium azide and pyrolysing the resultant 4,4,6,6,8,8-hexanitro-1,11-undecanedioic azide to the desired diisocyanate.

7. The method of preparing 5,5,7,7,9,9-hexanitro-1,13-tridecane diisocyanate which comprises reacting 6,6,8,8,10,10-hexanitro-1,15-pentadecanedioic diacid chloride with sodium azide and subsequently pyrolysing the resultant 6,6,8,8,10,10-hexanitro-1,15-pentadecanedioic azide to the desired diisocyanate.

8. The method of preparing 3,3,5,5,7,7-hexanitro-1,9-nonane diisocyanate which comprises reacting a 4,4,6,6,8,8-hexanitro-1,11-undecanedioic diacid halide with an azide selected from the group consisting of alkali and alkaline earth metal azides, at a temperature of from about 10 to about 22° C., and subsequently pyrolysing the resultant 4,4,6,6,8,8-hexanitro-1,11-undecanedioic azide, at a temperature of from about 70 to about 85° C., to the desired diisocyanate.

References Cited in the file of this patent

UNITED STATES PATENTS

| | | |
|---|---|---|
| 2,303,363 | Kaase et al. | Dec. 1, 1942 |
| 2,303,364 | Schirm | Dec. 1, 1942 |
| 2,544,709 | Mason | Mar. 13, 1951 |